United States Patent [19]
Guynn

[11] Patent Number: 6,010,140
[45] Date of Patent: Jan. 4, 2000

[54] CHILD BICYCLE SEAT AND TRAINING SYSTEM

[76] Inventor: Fred A. Guynn, 1413 Palmer, Laramie, Wyo. 82070

[21] Appl. No.: 08/974,368

[22] Filed: Nov. 19, 1997

[51] Int. Cl.[7] ............................................. B62J 7/00
[52] U.S. Cl. .................................... 280/291; 297/195.13
[58] Field of Search .......................... 280/288.4, 291, 280/202; 74/564; 297/195.1, 195.13, 423.1, 423.25, 423.34, 423.4

[56] References Cited

U.S. PATENT DOCUMENTS

| | | | |
|---|---|---|---|
| 3,185,489 | 5/1965 | Quisenberry | 280/291 |
| 4,638,682 | 1/1987 | Michiyama | 74/560 |
| 4,771,651 | 9/1988 | Haro | 74/564 |
| 5,033,325 | 7/1991 | Giard | 74/551.3 |
| 5,163,339 | 11/1992 | Giard | 74/551.3 |

*Primary Examiner*—Christopher P. Schwartz
*Assistant Examiner*—C. T. Bartz
*Attorney, Agent, or Firm*—Ramon L. Pizarro; Edwin H. Crabtree

[57] ABSTRACT

A bicycle passenger seat system for use on a bicycle having a frame having a cross member a diagonal member and a fork connected to a handlebar. The system includes a seat portion having means for mounting on the cross member of the bicycle; and a pair of foot supports having means for mounting the pair of foot supports on the fork of the bicycle, so that seat portion may be mounted on the cross member at a position near the fork of the bicycle, and so that the passenger may reach foot supports and the handlebars while on the seat portion.

16 Claims, 4 Drawing Sheets

CHILD BICYCLE SEAT AND TRAINING SYSTEM

BACKGROUND OF THE INVENTION (a) Field of the Invention

This invention generally relates to a system which allows the riding of a bicycle by more than one person. More specifically, but not by way of limitation, to a system that incorporates a child's bicycle seat that is mountable on a bicycle frame ahead of the bicycle's primary seat.

(b) Discussion of Known Art

Taking a child for a bicycle ride has long been an enjoyable pastime for parents. Thus the need for a device that allows the parent to carry a child on or along with the bicycle has long been recognized. Some of the important problems that need to be overcome by devices that are used to carry a child on a bicycle include the effects of the weight of the child on the stability of the bicycle. The weight of the child affects the location of the center of gravity of the combined riders and bicycle. Therefore by changing the center of gravity of the combined system one can produce significant changes in the maneuverability and stability of the bicycle.

A well known approach at providing a means for transporting children along with another rider on a bicycle has been to provide a seat that mounts behind the main seat and over the rear wheel of the bicycle. This approach has important disadvantages in that it does not allow the adult rider to observe the child at all times. This presents a serous safety hazard since the child may be trying loosen or remove any safety devices, such as seat belts or helmets, and the adult rider would not become aware of this until after he has stopped the bicycle or after an accident has occurred. Moreover, carrying the child over the rear wheel destabilizes the bicycle by changing the center of gravity of the entire system as described above.

Other approaches for transporting children include devices that mount on the front portion of the bicycle, ahead of the adult rider and to the handlebars or steering mechanism of the bicycle. These devices are seriously disadvantaged in that they can interfere with the steering of the bicycle. Thus, any device that mounts over the wheel of the bicycle is likely to be very dangerous in that the weight of the child is likely to have very detrimental effects on the maneuverability of the bicycle, and in that it places the child in foremost position of the bicycle; in essence placing the child in the front bumper position of the bicycle. Examples of devices that attach a child's seat to the steering system of a bicycle include patent No. 67,605 of the Nederlands, Swedish patent No. 105,747 to Boren, and U.S. Pat. No. 3,743,321 to Luschen et al.

Other devices have provided means for carrying the child over the mid portion of the bicycle. An example of such a device is shown in U.S. Pat. No. 2,448,867 to Darden. Darden teaches the use of an auxiliary seat and a handlebar and footrest that mount to the cross member of the bicycle frame. The Darden device has advantages in that it allows transportation of a child in an area where the child can be protected by the adult rider's arms and body. Moreover, by positioning the child over the cross member, one positions the child at a location where child's weight is likely to have the fewest effects on the center of gravity of the system. Unfortunately, however, the Darden device leaves several problems unanswered. One important problem is that it does not allow the child to vary the position of his or her feet. Thus the child must keep his or her feet at one position at all times. Moreover, the Darden device does not allow the child to participate in the handling or turning of the bicycle. Thus the Darden does little to help teach the child to train the child to ride the bicycle on his or her own.

Another known device is described in U.S. Pat. No. 4,632,453 to Robbin et al. The Robbin invention uses a seat that mounts to the horizontal tubular, or cross member, of the bicycle and a footrest assembly that mounts to the neck that houses the steering bearings on the bicycle frame. An important disadvantage of the Robbin device is that it does not provide means for allowing the child to use his or her hands while riding as a passenger. The Robbin device merely secures the child's feet at a convenient location so that the child does not touch the spokes with his or her feet.

In yet another device, shown in U.S. Pat. No. 4,919,479 to Loewke et al. a device which incorporates a handle and seat portion of unitary, one piece, construction, and an elongated recess with means for accepting the cross-member and the seat post on the bicycle. The Loewke device offers advantages in attachment to the bicycle, but does not solve the problems associated with allowing limited interaction with the riding of the bicycle. Thus devices such as the Loewke device and the Darden device do not allow the passenger to interact with the controls of the bicycle, and thus do not allow the child to learn the body positioning and effects of turning and the like while trying to control, maneuver and interact with the bicycle.

Yet another known device is shown in U.S. Pat. No. 4,969,658 to Levarek et al. The Levarek invention includes a cylindrical shaft that supports a passenger's seat and is attached to a pair of tabs that attach to a foot support means. The Levarek device offers advantages in the mechanisms used for adjustment of the various components of the invention, but does little to enhance the passenger's ability to interact with the controls of the bicycle or to allow the passenger to adjust his or her body while riding, in order to better accommodate for the forces experienced while riding the bicycle.

Still yet another device for allowing a passenger to ride on a bicycle is taught in U.S. Pat. No. 5,052,704 to Nauman. The Nauman device includes a saddle having an elongated, cylindrical shape which has been adapted for mounting over the cross-member on a bicycle. The Nauman device does little to allow the passenger to participate in the handling of the bicycle.

Thus, a review of known devices reveals that there remains a need for a passenger system that allows the passenger to interact with the bicycle, so that the passenger can begin to get a feel for the interaction between the bicycle and the rider while controlling the bicycle.

There remains a need for a passenger seat system that allows the passenger to adjust his or her position on the bicycle to allow the passenger to shift his body weight to accommodate for the effects of the terrain on the passenger's body. Thus there remains a need for a system that allows the user to shift the position of his feet on the bicycle.

Still further, there remains a need for a bicycle passenger seat system that minimizes the effects of the passenger's weight on the handling of the bicycle.

There remains a need for a bicycle passenger support that allows the main rider, the rider occupying the bicycle's original seat, to protect and view the passenger at all times.

SUMMARY

It has been discovered that the problems left unanswered by known art can be solved by providing a bicycle passenger seat system that includes the following elements:

a) a passenger seat that is mountable on the cross member of the bicycle; and b) a pair of foot supports that have been adapted for mounting on the fork of the bicycle, so that seat may be mounted on the cross member at a position near the fork of the bicycle, and so that the passenger may reach foot supports and the handlebars of the bicycle while on the passenger seat.

A preferred embodiment of the invention includes the use of a passenger handlebar that has been adapted for mounting from the handlebars or handlebar support of the bicycle. Additionally, it is preferred that a fender or other shielding device with sides that protect the user of the passenger seat from the spokes of the front wheel will be used with the system.

It is contemplated that a pair of foot supports that have been adapted for support from the bicycle frame may also be incorporated into the system. This pair of foot supports will provide the user of the passenger seat with the option of resting his feet over the frame or over the fork of the bicycle. This adds to the safety and flexibility to the system since the passenger may place his feet on the foot supports that are over the fork in situations where the bicycle is headed down a steep incline, for example, and on the foot supports that are over the frame for situations where the bicycle is being ridden over bumpy terrain. The relationship of the foot supports that are over the frame and the passenger seat will allow the passenger to stand up over the seat, thus allowing the passenger to absorb some of the shock from the bumps through his legs.

Thus it will be appreciated that the disclosed invention solves the problems with known bicycle passenger seating devices in that with the instant invention the passenger may use a passenger handlebar to feel and associate the turning of the bicycle with the turning of the passenger handlebar. Thus, it will be appreciated that the instant invention will allow the training of the passenger on how to ride and steer the bicycle.

Still further, it will be appreciated that the instant invention allows the passenger to adjust his position on the bicycle to allow the passenger to shift his body weight and posture to accommodate for the effects of the terrain on the passenger's body.

Still further, it will be appreciated that the instant passenger seat system allows placement of the passenger's center of gravity at a position where it does not have a direct effect on the steering of the bicycle, as is done with systems that are supported from the bicycle handlebars, for example. Moreover, the instant system minimizes the effects of the passenger's weight on the handling of the bicycle by placing the passenger's center of gravity near the main rider's center of gravity.

Still further, it will be appreciated that the disclosed bicycle passenger support system allows the main rider, the rider occupying the bicycle's original seat, to protect and view the passenger at all times. Thus the instant invention solves the problems associated with the visibility of the passenger, as is encountered with systems that mount the passenger's seat behind the main rider.

Thus the disclosed invention achieves new, synergistic, results that are not achievable with known configurations.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it is understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
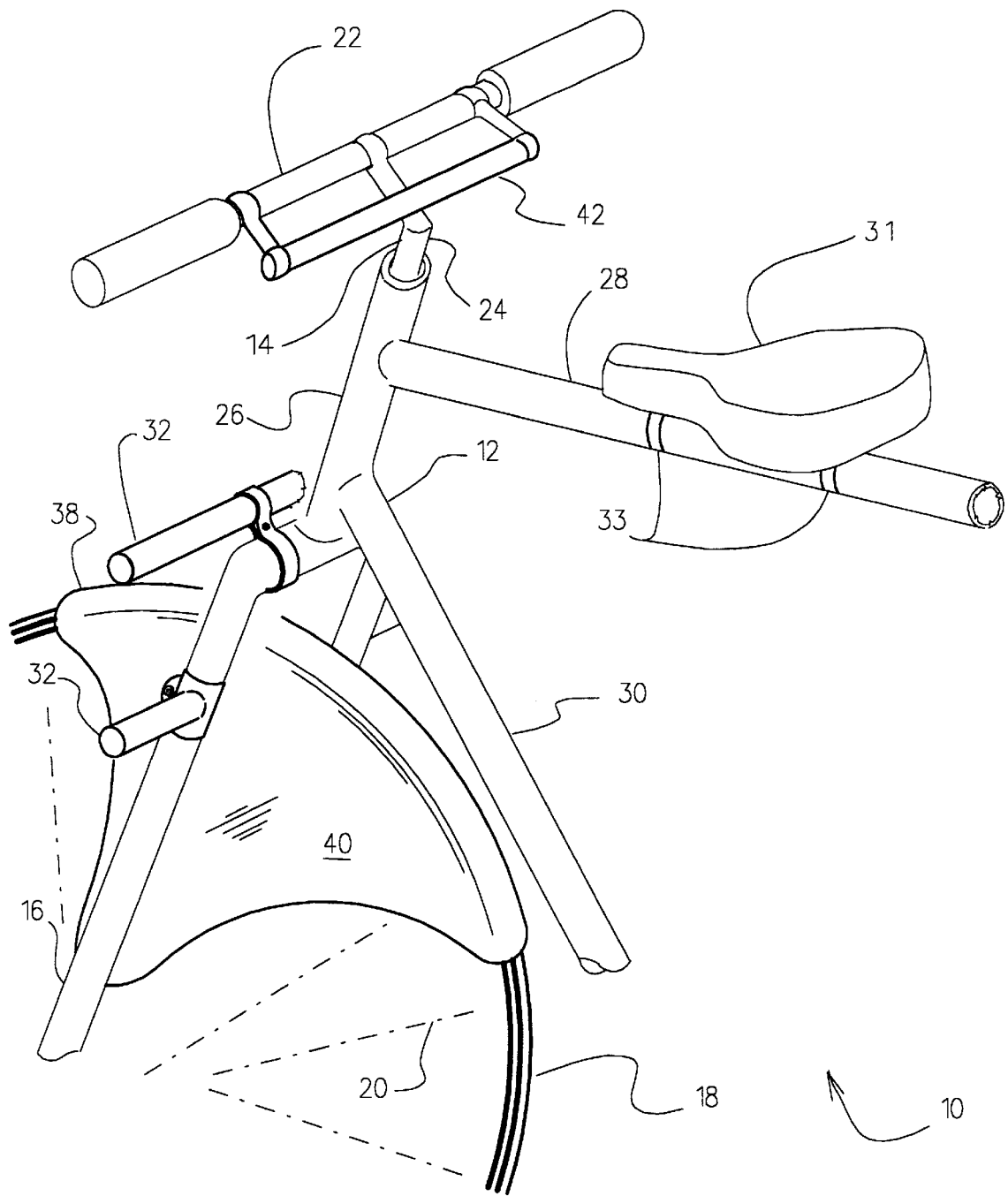
FIG. 1 is a perspective view of an embodiment of the invention used on a bicycle.

Turning now to FIG. 1, where a bicycle passenger seat and training system 10 has been shown mounted on a bicycle 12. The bicycle 12 has a steering means 14, or steering mechanism, that includes a fork 16 that supports a wheel 18 that may include spokes 20. The fork 16 is connected to a set of handlebars 22 by means of a stem 24. The bicycle includes a frame 26 that holds the stem 24 through a set of bearings that allow the stem to rotate relative to the frame 26. Also shown on FIG. 1 is that the frame 26 includes a cross-member 28 and a diagonal member 30 that serves, in part, to support the means for steering 14 the bicycle 12.

Figure 2:
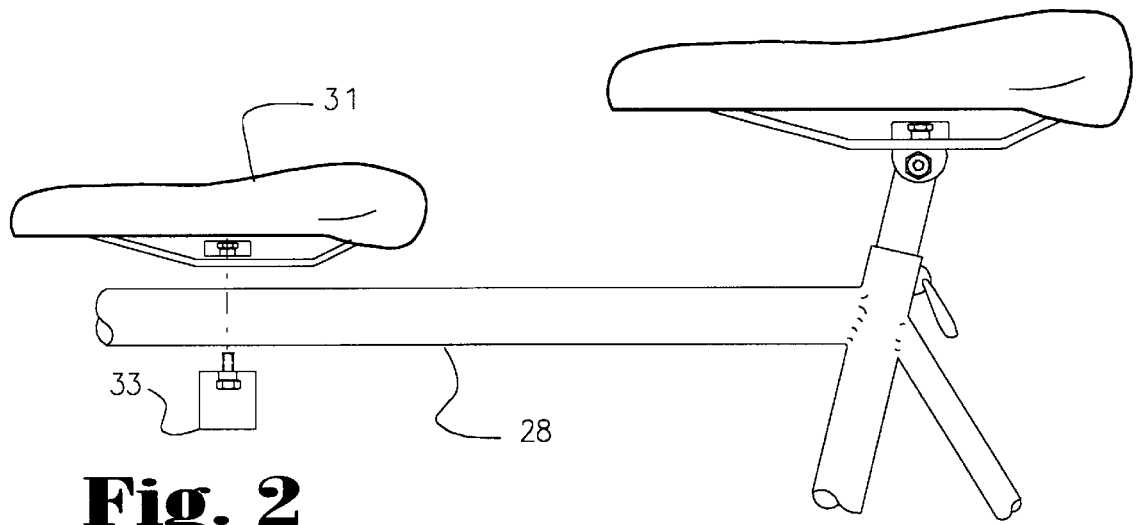
FIG. 2 is a side view of portions of a bicycle frame; the bicycle frame including a cross-member and illustrating an embodiment of the attachment of a passenger seat to the cross-member.

The embodiment of the instant invention as shown on FIG. 1 includes a passenger seat 31 that has been mounted to the cross-member 28 of the frame 26. As shown on FIG. 2, the passenger seat 31 may be attached to the cross-member 28 by means of clamps, adjustable supports 33, or the like, so that the position of the passenger seat 31 along the cross-member may be adjusted.

Referring now to FIGS. 1 through 4 it will be understood that a highly preferred embodiment of the invention will include at least one pair of foot supports 32 that mount to the fork 16 of the bicycle 12. The foot supports 32 attach to the fork 16 by means for mounting the foot supports 32 to the fork 16 of the bicycle. These means may be clamps, threaded fasteners that attach to the fork 16 or any other known attachment means.

Figure 3:
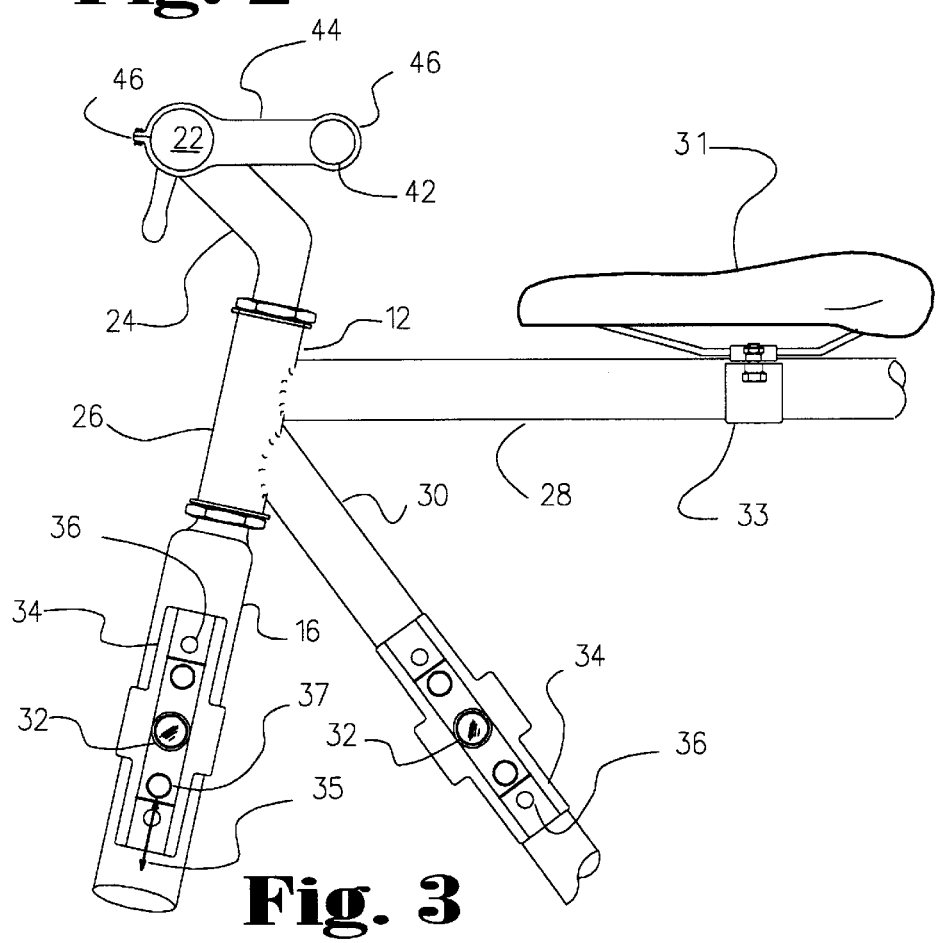
FIG. 3 illustrates attachment of the system to the frame of the bicycle and to the fork and steering means of the bicycle.

It is important to note, however, that the attachment means used to mount the foot supports 32 to the fork 16 should allow adjustment of the position of the foot supports along the fork. This may be by simply providing a clamping means that allows easy release of the clamping force against the fork 16. Examples of these devices include the cammed attachments typically used on quick release mechanisms for bicycle wheels, seats, and the like. Shown on FIG. 3 is one system for allowing adjustment of the position of the foot supports 32 along the fork 16 as indicated by arrow 35. The illustrated system simply uses a mounting plate 34 plurality of apertures 36 that can accept a peg, bolt, or other protrusion 37 to fix the position of the foot supports 32 relative to the plate 34. Thus, it is contemplated that the disclosed invention will allow the user to temporarily mount the foot supports 32 on the fork 16, and provide for adjustment of the foot support 32 along the fork 16 to allow for accommodating for differences in the body proportions of a passenger being carried on the bicycle 12.

Figure 4:
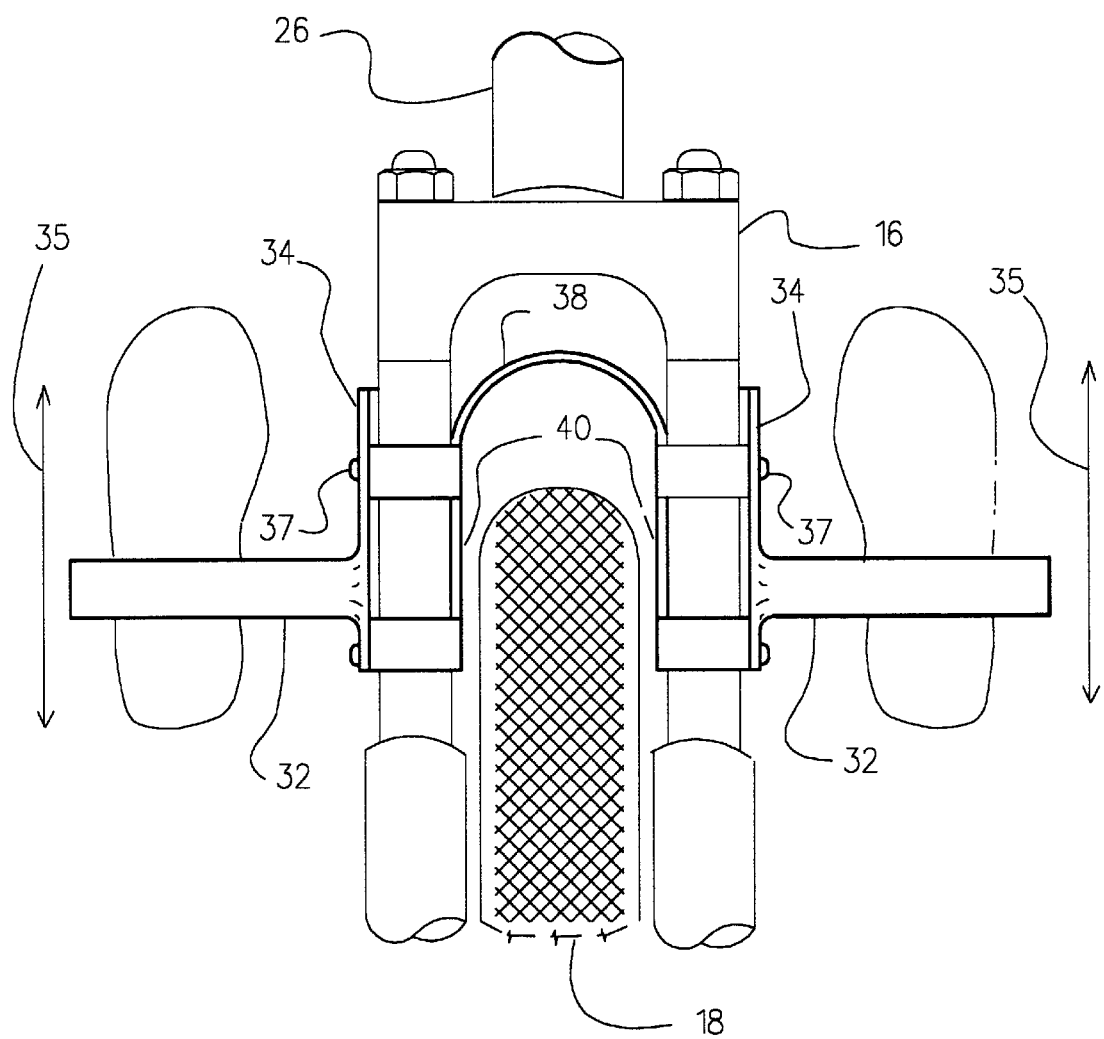
FIG. 4 is a view looking aft towards a bicycle with the disclosed invention. In particular, the view illustrates foot rests mounted to the fork of the bicycle as well as a fender with sides that prevent contact with the spokes of the bicycle wheel.

It is also important to note that, as shown on FIGS. 1 and 4, the preferred embodiment of the invention includes means for shielding the user from the spokes 20. In a preferred embodiment of the invention these means for shielding the user from the spokes is a fender 38 with side panels 40 that prevent a passenger's feet from accidental entanglement with the spokes 20 of the wheel 18. It is contemplated that the side panels 40 may attach to the fork 16 by one of many known attachment means.

As shown on FIG. 3, a preferred embodiment of the invention also includes a pair of foot supports 32 that have been mounted to the diagonal member 30 of the bicycle frame 26. Preferably, the foot supports 32 will be mounted on the diagonal member 30 by means that will allow adjustment of the position of the foot supports 32 along the diagonal member 30.

An important new and useful result that is achieved with the instant invention is that with the disclosed embodiments one may easily adjust the system to accommodate for differences in size of the passenger. Also, by providing foot supports 32 on the diagonal member 30 and on the fork 16 one allows the passenger to shift the position of his feet, from foot supports 32 on the fork 16 to the foot supports 32 on the diagonal member 30, and visa versa. This allows the user to alleviate the effects of bumps by standing on the foot supports on the diagonal member 30 and thus raising his body over the passenger seat 31 while traveling over bumpy terrain. Additionally, the system allows the user to stand on the foot supports 32 mounted on the fork 16 for situations where the bicycle is being ridden down very steep slopes, and thus allowing the passenger to align his legs with the direction of the slope, providing support that closely aligns with the center of gravity of the passenger.

Figure 5:
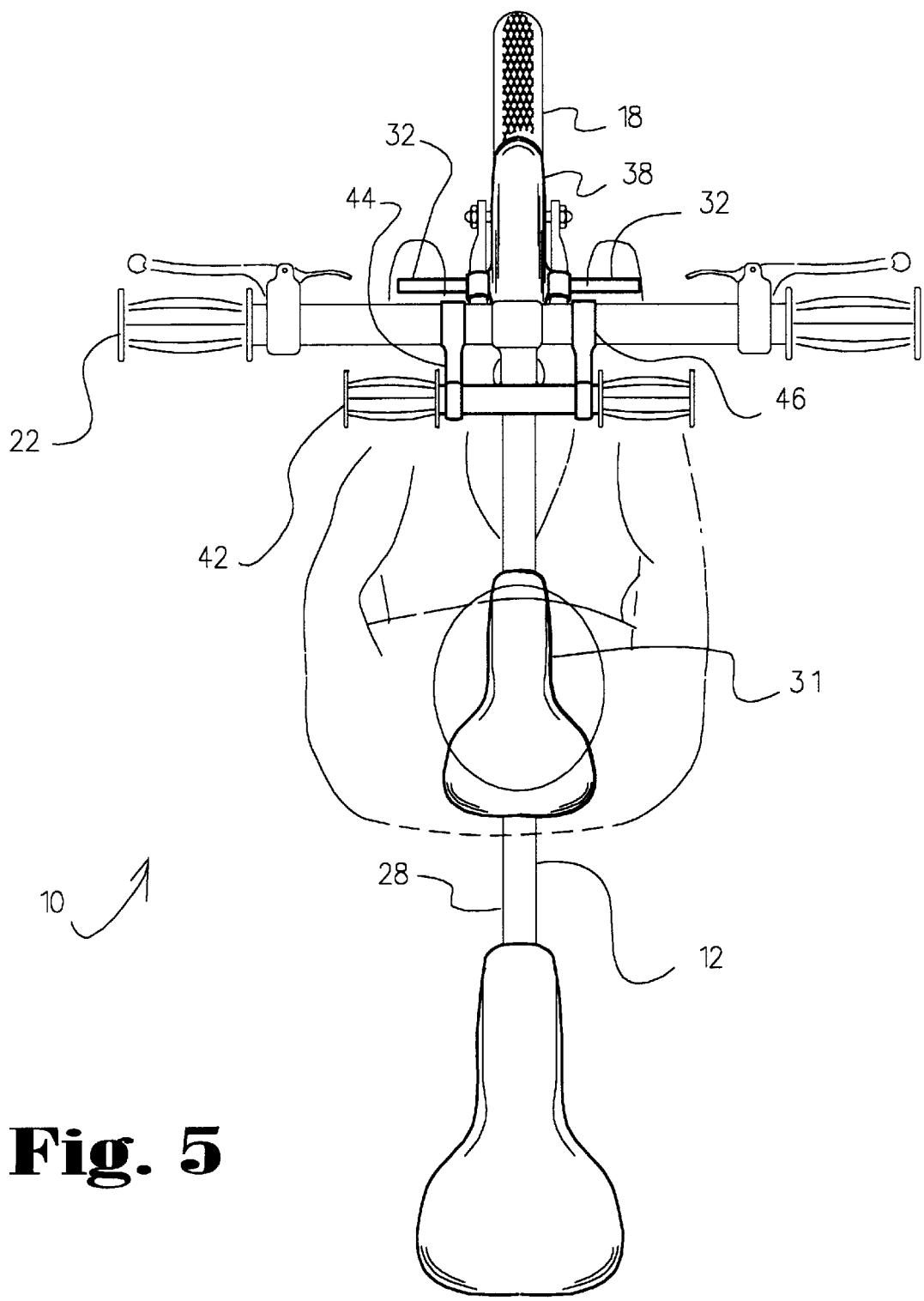
FIG. 5 is a top, plan view illustrating the use of the invention by a passenger and the relationship of the main seat of the bicycle and the passenger's seat.

Referring to FIGS. 3 and 5, it will understood that a preferred embodiment of the invention also incorporates a passenger handlebar 42 which preferably attaches to the bicycle's handlebars 22, or to the bicycle's stem 24 or other portions of the means for steering the bicycle. In the preferred embodiment illustrated in FIGS. 3 and 5 a pair of supports 44 are used to hold the passenger handlebar 42 at a position near the passenger. Preferably, the supports 44 will include means for gripping 46 the handle bars at both ends of the supports 44. It should be noted that while attachment of the passenger handlebar has been shown to be from the handlebars that are part of the means for steering the bicycle, it is contemplated that adequate support for the passenger handle bars 42 could be achieved by attachment to the stem 24.

It is contemplated that the use of a passenger handle bar 42 will allow the passenger to learn and experience the turning of the bicycle by providing an independent set of handlebars to which the passenger may hold on to. Also, it is contemplated that by providing a pair of passenger handlebars 42 one also provides point from which the passenger may hang on, so that the passenger may lodge himself on to the bicycle by forcing his feet against the foot supports while gripping the handle bars firmly.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A bicycle passenger seat system for use on a bicycle having a frame having a cross member a diagonal member and a fork connected to a handlebar, the system comprising:
    a seat portion having means adapted for mounting on the cross member of the bicycle;
    a passenger handlebar adapted for connection to the handlebar and extending towards the cross member; and
    a pair of foot supports having means adapted for mounting the pair of foot supports on the fork of the bicycle, so that mounting of the seat portion on the cross member at a position near the fork of the bicycle allows the passenger to reach the foot supports and the passenger handlebar while sitting on said seat portion.

2. A seat and system according to claim 1 wherein the passenger handlebar is generally parallel to the handlebar of the bicycle.

3. A seat and system according to claim 2 and further comprising a pair of foot supports having means adapted for mounting to the diagonal member of the bicycle frame.

4. A Seat and system according to claim 2 and further comprising means for shielding the user from the spokes.

5. A seat and system according to claim 4 wherein said means adapted for mounting the pair of foot supports on the fork of the bicycle further comprise means for adjusting the position of said foot supports along the fork.

6. A seat and system according to claim 5 and further comprising means adapted for mounting a pair of foot supports on the diagonal member of the bicycle.

7. A bicycle passenger seat and training system for use on a bicycle having a frame having a cross member and a steering means having a fork connected to a handlebar, the seat and system comprising:
    a seat portion having means adapted for mounting on the cross member of the bicycle;
    a passenger handlebar adapted for mounting from the steering means and extend towards the frame of the bicycle while remaining generally parallel to the handlebar of the bicycle; and
    a pair of foot supports having means for mounting the pair of foot supports on the fork of the bicycle, so that seat portion may be mounted on the cross member at a position near the fork of the bicycle, and so that the passenger may reach foot supports and the passenger handlebar while on said seat portion.

8. A seat and system according to claim 7 and further comprising a pair of foot supports having means adapted for mounting to the diagonal member of the bicycle frame.

9. A seat and system according to claim 8 and further comprising a fender having side panels that extend over the spokes.

10. A seat and system according to claim 9 wherein said means adapted for mounting the pair of foot supports on the fork of the bicycle further comprise means for adjusting the position of said foot supports along the fork.

11. A seat and system according to claim 10 wherein said means adapted for mounting the pair of foot supports on the diagonal member of the bicycle further comprise means for adjusting the position of said foot supports along the diagonal member.

12. A bicycle passenger seat and training system for use on a bicycle having a frame having a cross member and a diagonal member supporting a means for steering the bicycle, the means for steering the bicycle including a fork connected to a handlebar, the fork supporting a wheel having spokes, the seat and system comprising:

a seat portion having means adapted for mounting on the cross member of the bicycle;

a passenger handlebar adapted for mounting from the steering means and extend towards the frame of the bicycle while the passenger handlebar remains generally parallel to the handlebar of the bicycle;

a pair of foot supports having means adapted for mounting the pair of foot supports on the fork of the bicycle; and means for shielding the user from the spokes, so that seat portion may be mounted on the cross member at a position near the fork of the bicycle, and so that the passenger may reach said foot supports and the passenger handlebar while on said seat portion, and so that the passenger is shielded from the spokes.

13. A seat and system according to claim 12 and further comprising a pair of foot supports having means adapted for mounting to the diagonal member of the bicycle frame.

14. A seat and system according to claim 13 wherein said means for shielding the user from the spokes comprises a fender having side panels that are adapted to extend over the spokes.

15. A seat and system according to claim 14 wherein said means adapted for mounting the pair of foot supports on the fork of the bicycle further comprise means for adjusting the position of said foot supports along the fork.

16. A seat and system according to claim 15 wherein said means adapted for mounting the pair of foot supports on the diagonal member of the bicycle further comprise means for adjusting the position of said foot supports along the diagonal member.

* * * * *